Dec. 28, 1943.   J. A. VARNEY   2,337,697
WORK-SETTING INDICATOR
Filed Sept. 20, 1941
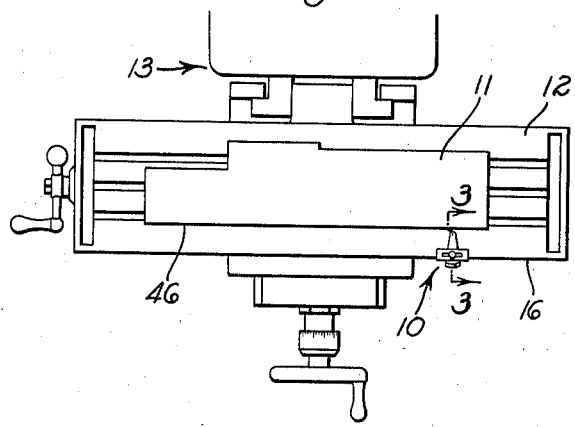
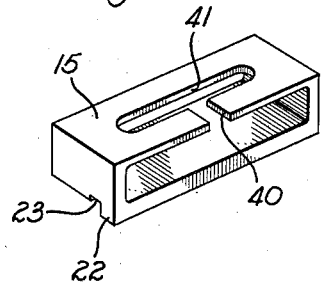
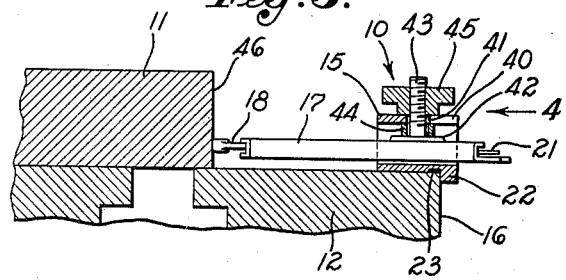
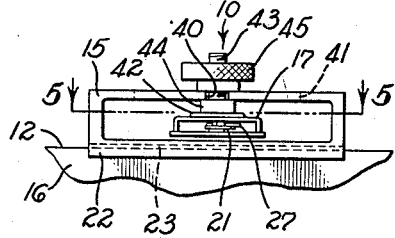
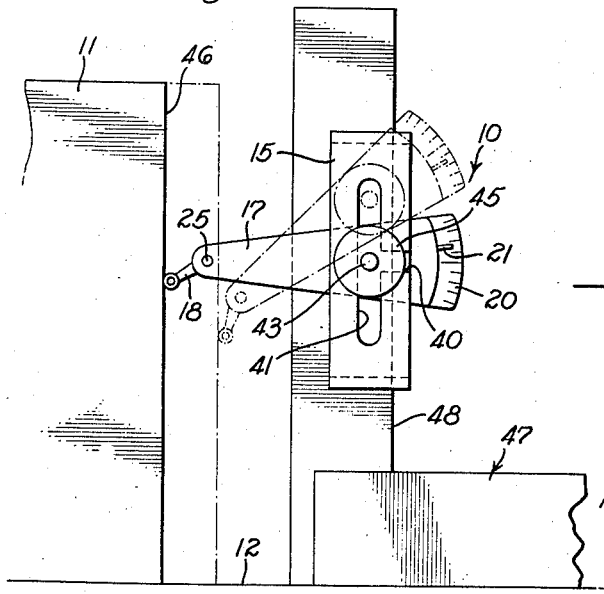
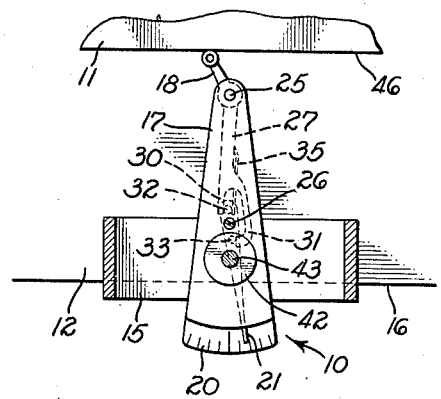
INVENTOR
JUSTIN ARNOLD VARNEY
BY
HARRIS, KIECH, FOSTER & HARRIS
ATTORNEYS.

Patented Dec. 28, 1943

2,337,697

UNITED STATES PATENT OFFICE 2,337,697

WORK-SETTING INDICATOR

Justin Arnold Varney, Los Angeles, Calif.

Application September 20, 1941, Serial No. 411,764

4 Claims. (Cl. 33—172)

The present invention is a precision tool for guidance in aligning surfaces in parallel relationship to reference straight edges, and is applied particularly to the alignment of work pieces in preparation for machining operations. The invention is being initially embodied in a small tool for use by machinists and will be so described for the purpose of this disclosure. As will be apparent, such a description will afford adequate guidance for employing the invention in other arts for other specific purposes.

A recurring task for a machinist is to set up a work piece in a milling machine, shaper, surface grinder or the like with a given surface of the work piece accurately aligned for a machining operation. Prevalent work-setting practices may be illustrated by specific reference to milling machines. Like many other metal working devices, the milling machine has a work table with an accurately aligned surface area and accurately aligned reference edges. The machinist usually aligns a work piece on the table directly or indirectly with reference to the surface of the table and/or with reference to one of the reference edges. A square, protractor, parallels, or other auxiliary apparatus is frequently used.

Several difficulties are inherent in such a work-setting procedure. Shop lighting is usually inadequate for close observation necessary for accurate alignment of a work piece. It is common experience to find deep shadows obscuring those surfaces which are critical for alignment. Reliable inspection under these circumstances is difficult or impossible. Moreover, with usual methods the task of accurate alignment of work pieces is frequently rendered difficult and subject to uncertainty by the presence of foreign metal particles on critical surfaces. It is common experience that some of the particles adhere tenaciously despite the most careful wiping and examination of these surfaces, not only because of the characteristic film of oil but because of the slight magnetism usually present in machinery and machined pieces. Even one foreign particle trapped between the edge of a square and the work piece, for instance, may cause the operator unwittingly to set the work piece out of accurate alignment. Such a condition becomes particularly important on small work pieces where the critical aligning surface is short and therefore thrown relatively far out of alignment by a foreign particle. These difficulties coupled with the inescapable uncertainty attached to the task of work piece alignment by usual methods render accurate work-setting difficult, time-consuming, and a strain on the machinist.

The general object of the present invention is to overcome these difficulties and to permit a uniformly high degree of accuracy in work-setting to be obtained with ease and dispatch. One object of the invention is to provide a device that will make possible a procedure in which isolated particles or small accumulations of particles on the work surface will not interfere with alignment determination. Another object of the invention is to provide a work-setting device that will tend to remove such particles in the course of the alignment procedure. A further object is to provide a work-setting device incorporating a conveniently visible alignment indicator substantially spaced from the surface of the work piece. A further object is to provide an accurate work-setting device of inexpensive construction and requiring no burdensome degree of accuracy in manufacture. A still further object in mind is to make widely available a small device of the character described for inclusion in machinists' tool kits.

Further objects and advantages of the invention will be apparent from the following detailed description, taken with the accompanying drawing.

In the drawing, which is to be considered as illustrative only:

Fig. 1 is a plan view of a milling machine illustrating the manner in which the invention may be employed;

Fig. 2 is a perspective view of a shoe employed in my invention;

Fig. 3 is a transverse section of the work-setting device taken as indicated by the line 3—3 of Fig. 1;

Fig. 4 is a side elevation of the work-setting device taken as indicated by the arrow 4 in Fig. 3;

Fig. 5 is a horizontal section taken as indicated by the line 5—5 of Fig. 4; and Fig. 6 is a view in side elevation showing the invention employed for vertical alignment of a work surface.

Fig. 1 shows my new work-setting device generally designated 10 as employed to align a work piece 11 on the work table 12 of a milling machine 13. The principal parts of the device include: a shoe 15 adapted for sliding engagement with a straight edge, the straight edge in this instance being the longitudinal edge provided by the side face 16 of the work table 12; an arm 17 carried by the shoe, preferably in an adjustable and removable manner; a feeler 18 on the arm; and an indicating means including a graduated scale 20 and a pointer 21 responsive on a magnified scale to minute movements of the feeler.

The shoe 15 may be of any suitable configuration and construction to provide a guide surface for sliding contact with the previously mentioned side face 16 of the work table. In my preferred construction shown in the drawing the shoe 15 is formed with a longitudinal shoulder 22 on its under side and is adapted to rest on the margin of the work table 12 with the face of the longitudinal shoulder 22 against the side face 16 of the work table, the face of the shoulder serving as the required guide surface. A feature of this particular form of the invention is the provision of a longitudinal recess 23 on the under side of the shoe 15 adjacent the longitudinal shoulder 22 to provide clearance for small particles that might be dislodged by sliding contact of the shoe with the work table. Such a recess minimizes the likelihood of small particles disturbing the alignment of the sliding shoe. If a few preliminary traverses of the shoe are made in preparation for an alignment procedure, the disloged material tends to be displaced into the zone of the recess 23.

The arm 17, together with the feeler 18 and the indicating means responsive thereto, may be constructed in one unit, for example as indicated in the Cash Patent No. 1,645,473, issued October 11, 1927. In such a construction the arm 17 is in the form of a flat casing within which the feeler 18 is mounted on a pivot screw 25 and the pointer 21 is mounted on a pivot screw 26. The feeler 18 is in the form of a lever with an inwardly extending arm 27, and the pointer 21 is in the form of a lever positioned and adapted to cooperate with said arm 27. The arm 27 of the feeler is formed with two spaced fingers 30 and 31 for contact respectively with small projections or lugs 32 and 33 carried by the pointer 21 on opposite sides of the pointer axis. A suitable leaf spring 35 continuously urges the feeler 18 in a clockwise direction. At the limit position to which the leaf spring urges the feeler, the pointer is at the right end of the scale as viewed in Fig. 5, and any departure of the feeler from the limit position results in corresponding leftward movement of the pointer tip, as viewed in Fig. 5.

An arm 17 of the character described may be mounted on the shoe 15 in any suitable manner. In the preferred practice of my invention the shoe 15 is of hollow construction in order to allow the plane of the feeler of the indicating mechanism to lie as close as possible to the plane of the under face of the shoe, thereby allowing the device to be used to align work pieces of thin section and in general to be used under the most widely varied conditions. As best shown in Fig. 2 the shoe may be cut from a block of metal to a box-like configuration open at both sides and may be provided with a short lateral slot 40 from one side communicating with a longitudinal slot 41. The arm 17 is formed with a circular boss 42 on its upper surface and is equipped with a stud 43 concentric thereto. Normally the stud is surrounded by a spacer sleeve 44 and is engaged by a suitable thumb nut 45 as indicated in Figs. 3 and 4. It is apparent that the arm may be readily removed from the shoe. With the thumb nut 45 loose on the stud 43, the stud may be shifted freely in the two slots 40 and 41 and the arm may be rotated to various positions. Once the arm is adjusted to the satisfaction of the operator the thumb nut 45 may be tightened to retain the arm rigidly at the selected setting.

The manner in which the device may be employed in setting work will be readily understood from the foregoing description. In one practice of the invention, for example, the operator initially visually aligns the work piece 11 with the longitudinal side 16 of the work table and lightly clamps the work piece in place, the spacing of the work piece from the longitudinal edge 16 being kept within the range of adjustment of the arm 17. After wiping the longitudinal edge 16 of the work table as well as the reference surface 46 of the work piece 11 to remove most of the foreign metal particles, the operator may make a few preliminary traverses of the longitudinal edge of the work table with the shoe 15 and then may adjust the arm 17 to a position with reference to the work piece that will cause the pointer 21 to hover at any intermediate point on the scale 20. In making such adjustment the arm 17 may be turned to various angles, for example as indicated by dotted lines in Fig. 6, and, if necessary, the stud 43 that carries the arm may be shifted into the lateral slot 40.

To obtain an exceedingly close indication of the precise alignment of the working surface 46 relative to the longitudinal edge 16, the operator merely observes the action of the pointer 21 as the shoe is slid along the longitudinal edge of the work table with the feeler 18 in responsive contact with the working surface 46. The feeler 18 tends to displace any small particles or accumulations of particles in its path, but any small particles that fail to be displaced merely cause the pointer to flicker erratically as the feeler passes over them. The operator disregards any such erratic activity of the pointer and pays especial attention to any evidence of progressive movement of the pointer in response to progressive movement of the feeler along the working surface. At such time as the pointer indicates lack of alignment of the work piece, the work piece may be moved slightly, for instance by tapping lightly with a machinist's hammer, in such direction as movement of the pointer suggests. Even an infinitesimal departure of the work surface from absolute parallelism with the reference edge will be revealed by a marked drift of the pointer in one direction or another during a traverse of the shoe. It is found that very few traverses of the work-setting device suffice to obtain virtually perfect alignment consistently.

Fig. 6 illustrates the manner in which the invention may be employed for guidance in establishing accurate vertical alignment of the working surface 46 of the work piece 11. In the illustrated procedure a machinist's square 47 is placed on the surface of the work table 12 with the blade 48 of the square extending vertically upward. The shoe 15 is placed in sliding engagement with the inner edge of the blade 48 and the arm 17 is adjusted as heretofore described for indicating variations in the working surface 46 as the shoe slides vertically up and down the blade.

The preferred form of the invention set forth in specific detail herein for the purpose of disclosure will suggest various changes and substitutions under my concept, and I reserve the right to all such departures from my specific disclosure that properly fall within the scope of my appended claims.

I claim as my invention:

1. A precision work-setting device for guidance in aligning a work surface of an object parallel to a reference straight edge, comprising: a shoe having a guide surface for sliding contact with said straight edge, said shoe being of hollow construction with an outer wall formed with a slot; and a feeler unit movably mounted in said slot in a position extending laterally from said guide surface for responsive contact with said work surface.

2. A precision work-setting device for guidance in aligning a work surface of an object parallel to the edge of a table of a metal working machine, comprising: a shoe of hollow construction with spaced top and bottom walls, said shoe having two guide surfaces on its under side in two mutually perpendicular planes for sliding contact respectively with the horizontal and vertical surfaces along said edge of the work table; and a feeler unit adjustably mounted in said shoe between said top and bottom walls in a position extending laterally from the shoe for responsive contact with said work surface of the object.

3. A portable precision work-setting device to be used as a hand tool for guidance in aligning a work surface of an object parallel to the edge of a table of a metal working machine, comprising: a shoe having two bottom guide surfaces in two mutually perpendicular planes for sliding contact respectively with the horizontal and vertical surfaces along said edge of the work table, said shoe having a recess extending along the juncture of said planes to receive particles displaced by sliding movement of the shoe along said edge; and a feeler unit adjustably mounted on said shoe in a position extending laterally from the shoe for responsive contact with said work surface.

4. A portable precision work-setting device to be used as a hand tool for guidance in aligning a work surface of an object parallel to the edge of a table of a metal working machine, comprising: a shoe having two bottom guide surfaces in two mutually perpendicular planes for sliding contact respectively with the horizontal and vertical surfaces along said edge of the work table, whereby said shoe may be moved laterally into contact with said two surfaces at the work table and slid along said surfaces; and a feeler unit adjustably mounted on said shoe in a position extending laterally from the shoe for responsive contact with said work surface.

JUSTIN ARNOLD VARNEY.